(12) United States Patent
Hosoya et al.

(10) Patent No.: US 11,913,565 B2
(45) Date of Patent: Feb. 27, 2024

(54) ELECTRIC VALVE

(71) Applicant: FUJIKOKI CORPORATION, Tokyo (JP)

(72) Inventors: Takeshi Hosoya, Tokyo (JP); Yusuke Arai, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 177 days.

(21) Appl. No.: 17/754,834

(22) PCT Filed: Oct. 5, 2020

(86) PCT No.: PCT/JP2020/037676
§ 371 (c)(1),
(2) Date: Apr. 13, 2022

(87) PCT Pub. No.: WO2021/085038
PCT Pub. Date: May 6, 2021

(65) Prior Publication Data
US 2024/0026988 A1 Jan. 25, 2024

(30) Foreign Application Priority Data

Oct. 29, 2019 (JP) ................................ 2019-196480

(51) Int. Cl.
*F16K 31/04* (2006.01)
*F16K 31/50* (2006.01)

(52) U.S. Cl.
CPC .............. *F16K 31/04* (2013.01); *F16K 31/50* (2013.01); *F16K 31/504* (2013.01)

(58) Field of Classification Search
CPC ......... F16K 31/04; F16K 31/50; F16K 31/504
USPC ...................................... 251/129.01
See application file for complete search history.

(56) References Cited

U.S. PATENT DOCUMENTS

| | | | | |
|---|---|---|---|---|
| 3,757,263 A * | 9/1973 | Saarem | ................. | H01F 7/1607 335/262 |
| 4,501,297 A * | 2/1985 | Baker | ................... | F16K 31/045 137/554 |
| 6,460,567 B1 * | 10/2002 | Hansen, III | ............. | F16K 31/04 137/625.48 |

(Continued)

FOREIGN PATENT DOCUMENTS

| | | |
|---|---|---|
| CN | 101592252 A | 12/2009 |
| CN | 205207692 U | 5/2016 |

(Continued)

OTHER PUBLICATIONS

Office Action dated Sep. 27, 2023 for the corresponding Chinese Application No. 2020800682165, with English translation.

(Continued)

*Primary Examiner* — William M McCalister
(74) *Attorney, Agent, or Firm* — LUCAS & MERCANTI, LLP

(57) ABSTRACT

In an electric valve, an upper surface of a main body portion of a valve body, a cylindrical portion of the valve body, and a flange member form a groove in an annular recess shape. A stator unit includes a tubular portion that surrounds the groove. A sealing member is disposed in the groove and held between the cylindrical portion of the valve body and the tubular portion of the sealing member.

3 Claims, 3 Drawing Sheets

(56) References Cited

U.S. PATENT DOCUMENTS

| | | | | |
|---|---|---|---|---|
| 6,561,480 B1* | 5/2003 | Komiya | F25B 41/347 251/129.05 |
| 8,297,588 B2* | 10/2012 | Ohuchi | F25B 41/34 251/129.13 |
| 8,720,486 B2* | 5/2014 | Uchida | F16K 31/04 62/77 |
| 9,366,353 B2* | 6/2016 | Ooe | F16K 31/04 |
| 9,803,770 B2* | 10/2017 | Takahashi | F16K 3/0254 |
| 10,352,475 B2* | 7/2019 | Uehara | F16K 37/0041 |
| 2006/0043325 A1* | 3/2006 | Umezawa | F25B 41/35 251/129.11 |
| 2006/0261302 A1* | 11/2006 | Inoue | F16K 31/506 251/129.11 |
| 2009/0294713 A1* | 12/2009 | Harada | F25B 41/35 251/129.15 |
| 2010/0181514 A1* | 7/2010 | Ohuchi | F16K 31/047 251/284 |
| 2014/0291562 A1* | 10/2014 | Ooe | F25B 41/35 251/129.11 |
| 2016/0146366 A1* | 5/2016 | Takahashi | F16K 3/00 251/129.15 |
| 2016/0341336 A1* | 11/2016 | Harada | F25B 41/35 |

FOREIGN PATENT DOCUMENTS

| | | |
|---|---|---|
| EP | 3779253 A1 | 2/2021 |
| JP | 2009-287663 A | 12/2009 |
| JP | 2012-062952 A | 3/2012 |
| JP | 5249634 B2 | 7/2013 |
| JP | 2013-228000 A | 11/2013 |
| JP | 2016-098925 A | 5/2016 |
| JP | 5982168 B2 | 8/2016 |
| JP | 2018-115768 A | 7/2018 |
| WO | 2019/187866 A1 | 10/2019 |

OTHER PUBLICATIONS

Office Action dated Oct. 3, 2023 for the corresponding Japanese Application No. 2022-169590, with English translation.
PCT, International Search Report for the corresponding application No. PCT/JP2020/037676, dated Nov. 24, 2020, with English translation.
PCT, Written Opinion for the corresponding application No. PCT/JP2020/037676, dated Nov. 24, 2020, with English translation.

* cited by examiner

ELECTRIC VALVE

CROSS REFERENCE TO RELATED APPLICATION

This Application is a 371 of PCT/JP2020/037676 filed on Oct. 5, 2020 which, in turn, claimed the priority of Japanese Patent Application No. 2019-196480 filed on Oct. 29, 2019, and both applications are incorporated herein by reference.

TECHNICAL FIELD

The present invention relates to an electric valve. In particular, the present invention relates to an electric valve which includes a rotor disposed in a can and a stator attached on an outside of the can.

BACKGROUND ART

Patent Literature 1 describes an example of an electric valve of the related art. The electric valve in Patent Literature 1 includes a valve body, a valve element that opens and closes a port of the valve body, a can made of metal and disposed above the valve body, a rotor disposed in the can, and a stator unit attached on an outside of the can. The electric valve includes a tubular portion and two O-rings. The tubular portion protrudes downward from the stator unit and surrounds an outer peripheral surface of the valve body. The two O-rings seal a space between the tubular portion and the valve body. This configuration inhibits water from entering between the can and a yoke of the stator unit and inhibits corrosion caused by potential differences between different kinds of metals and rust caused by salt water.

In an electric valve described in Patent Literature 2, an O-ring is disposed between a can and a resin mold of the stator unit, and is supported by a plate member in a circular shape attached to a lower end of the resin mold. As in the electric valve of Patent Literature 1, this configuration also inhibits water from entering between the can and a yoke of the stator unit and inhibits corrosion caused by potential differences between different kinds of metals and rust caused by salt water.

CITATION LIST

Patent Literature

Patent Literature 1: Japanese Patent No. 5249634
Patent Literature 2: Japanese Patent No. 5982168

SUMMARY OF INVENTION

Technical Problem

However, the electric valve in Patent Literature 1 has recessed grooves in an annular shape on the outer peripheral surface of the valve body to accommodate the two O-rings. Therefore, a cutting process for forming the recessed grooves is required. The electric valve in Patent Literature 2 needs the plate member in the circular shape for supporting the O-ring. Therefore, manufacturing processes for or members in the electric valve increase, resulting in higher manufacturing costs. The size of the electric valve tends to be large due to providing the recessed groove or the plate member.

In view of this, it is an object of the present invention to provide an electric valve that is small in size, inexpensive, and capable of inhibiting corrosion and rust caused by water entering.

Solution to Problem

To achieve the object described above, an electric valve according to the present invention includes a valve body including a valve chamber, a flange member in a circular shape whose inner peripheral edge is attached to a cylindrical portion protruding from a surface of the valve body, a can in a cylindrical shape attached to an outer peripheral edge of the flange member, a rotor disposed in the can, a valve element driven by rotation of the rotor to open and close a port in the valve chamber, and a stator unit attached on an outside of the can. The surface of the valve body, the cylindrical portion of the valve body, and the flange member form a groove in an annular recess shape, the stator unit includes a tubular portion that surrounds the groove, and a sealing member in an annular shape is disposed in the groove and held between the cylindrical portion of the valve body and the tubular portion of the stator unit.

According to the present invention, the surface of the valve body, the cylindrical portion of the valve body, and the flange member form the groove in the annular recess shape. The stator unit includes the tubular portion that surrounds the groove. The sealing member in the annular shape is disposed in the groove and held between the cylindrical portion of the valve body and the tubular portion of the stator unit. With this configuration, the sealing member can be disposed in the electric valve without an annular recessed groove machined on an outer circumferential surface of the cylindrical portion of the valve body, or without a supporting member for the sealing member. Thus, manufacturing processes for and members in the electric valve can be reduced. Therefore, it is possible to inhibit corrosion and rust caused by water entering with a small in size and inexpensive configuration.

In the present invention, it is preferable that an external thread portion be formed on the outer circumferential surface of the cylindrical portion of the valve body, an internal thread portion into which the external thread portion is screwed be formed so as to open on the surface of the valve body, and the sealing member be disposed in contact with the surface of the valve body. Therefore, it is possible to inhibit, by the sealing member, water from entering a point at which the external thread portion is screwed into the internal thread portion.

In the present invention, it is preferable that the tubular portion of the stator unit include an inner circumferential surface defining an inner diameter of the tubular portion, the inner diameter increasing in a direction from the flange member toward the surface of the valve body. With this configuration, when the can is inserted inside the stator unit and the tubular portion of the stator unit is disposed to surround the groove in an annular shape, the inner circumferential surface of the tubular portion of the stator unit can push the sealing member toward the surface of the valve body, and the sealing member can be pressed against the surface of the valve body. Therefore, it is possible to more effectively inhibit, by the sealing member, water from entering the point at which the external thread portion is screwed into the internal thread portion.

Advantageous Effects of Invention

According to the present invention, it is possible to inhibit, with the small in size and inexpensive configuration, corrosion and rust caused by water entering.

DESCRIPTION OF EMBODIMENTS

First Embodiment

Figure 1:
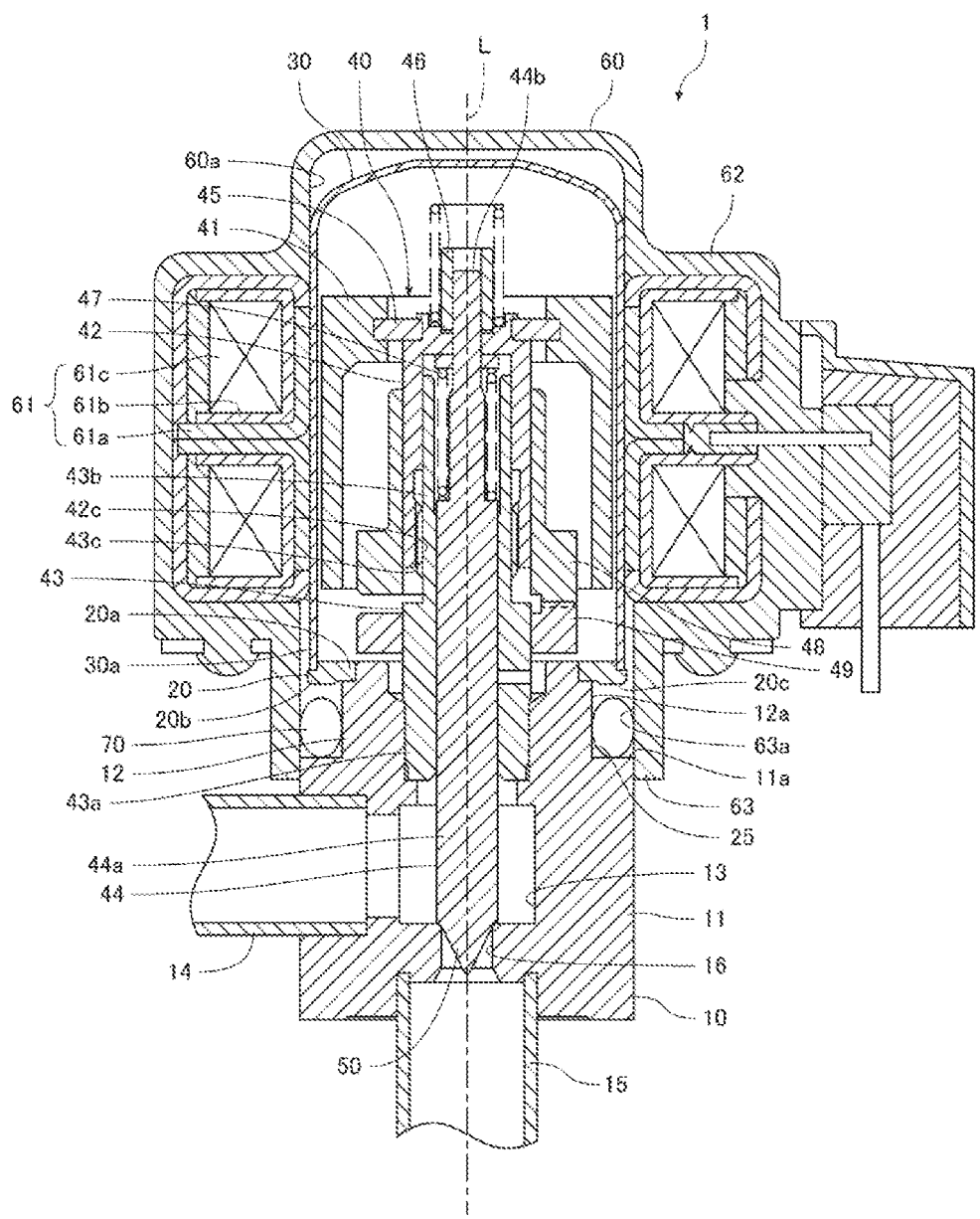
FIG. 1 is a longitudinal sectional view of an electric valve according to a first embodiment of the present invention.

An electric valve according to a first embodiment of the present invention is described below with reference to FIG. 1. The electric valve 1 according to the present embodiment is, for example, used for adjusting the flow rate of refrigerant in a refrigeration cycle or the like. Electric valves according to a second embodiment and a third embodiment are used for the same purpose as the electric valve according to the first embodiment. FIG. 1 is a sectional view (longitudinal sectional view) along an axis of the electric valve according to the first embodiment of the present invention.

As illustrated in FIG. 1, the electric valve 1 includes a valve body 10, a flange member 20, a can 30, a driving mechanism 40, a valve element 50, a stator unit 60, and a sealing member 70.

The valve body 10 is made of, for example, metal such as brass or aluminum alloy. The valve body 10 integrally includes a main body portion 11 in a round columnar shape and a cylindrical portion 12. The cylindrical portion 12 protrudes upward from an upper surface 11a of the main body portion 11 (i.e., a surface of the valve body 10). A valve chamber 13 is provided inside the main body portion 11. A conduit 14 is attached to the main body portion 11 and extends to the left in FIG. 1. A conduit 15 is attached to the main body portion 11 and extends downward in FIG. 1. The conduit 14 is connected to the valve chamber 13. The conduit 15 is connected to the valve chamber 13 via a port 16. An inner space of the cylindrical portion 12 is connected to the valve chamber 13.

The flange member 20 is made of, for example, metal such as stainless steel. The flange member 20 has an annular plate shape. An inner peripheral edge 20a of the flange member 20 is joined to an upper end of the cylindrical portion 12 of the valve body 10 by brazing or other means.

The upper surface 11a of the main body portion 11 of the valve body 10, an outer circumferential surface 12a of the cylindrical portion 12, and a lower surface 20c of the flange member 20 form a groove 25 in an annular recess shape.

The can 30 is made of, for example, metal such as stainless steel. The can 30 has a cylindrical shape with its upper end closed. The lower end 30a of the can 30 is joined to an outer peripheral edge 20b of the flange member 20 by welding or other means. The driving mechanism 40 is disposed in the can 30.

The driving mechanism 40 drives the valve element 50 in an up-and-down direction (an open-and-close direction). The driving mechanism 40 includes a rotor 41, a valve shaft holder 42, a guide bush 43, and a valve shaft 44.

The rotor 41 has a substantially cylindrical shape. An outer diameter of the rotor 41 is slightly smaller than an inner diameter of the can 30. The rotor 41 includes a permanent magnet. The rotor 41 is rotatably disposed in the can 30.

The valve shaft holder 42 has a cylindrical shape with its upper end closed. A support ring 45 is fixed to the upper end of the valve shaft holder 42 by caulking. The rotor 41 and the valve shaft holder 42 are integrally coupled via the supporting ring 45. An internal thread portion 42c is formed on an inner circumferential surface of the valve shaft holder 42.

The guide bush 43 integrally includes a large-diameter cylindrical portion 43a and a small-diameter cylindrical portion 43b. The small-diameter cylindrical portion 43b is coaxially connected to an upper end of the large-diameter cylindrical portion 43a. An outer diameter of the large-diameter cylindrical portion 43a is larger than an outer diameter of the small-diameter cylindrical portion 43b. An external thread portion 43c is formed on an outer circumferential surface of the small-diameter cylindrical portion 43b. The external thread portion 43c is screwed into the internal thread portion 42c of the valve shaft holder 42. The large-diameter cylindrical portion 43a is press-fitted inside the cylindrical portion 12 of the valve body 10. The guide bush 43 and the valve body 10 are integrally coupled.

The valve shaft 44 includes a stem body 44a in a round columnar shape and an upper small-diameter portion 44b in a round columnar shape. The upper small-diameter portion 44b is coaxially connected to an upper end of the stem body 44a. A diameter of the upper small-diameter portion 44b is smaller than a diameter of the stem body 44a. The upper small-diameter portion 44b is extended through the valve shaft holder 42. A push nut 46, which is a retainer, is attached to the upper small-diameter portion 44b. The valve shaft 44 includes a step portion between the stem body 44a and the upper small-diameter portion 44b. A compression coil spring 47 is disposed between the step portion and the valve shaft holder 42. The valve shaft 44 is pushed downward by the compression coil spring 47.

An upper stopper member 48 is attached to the valve shaft holder 42. A lower stopper member 49 is attached to the large-diameter cylindrical portion 43a of the guide bush 43. When the valve shaft holder 42 rotates and reaches a lower limit position, the upper stopper member 48 comes into contact with the lower stopper member 49 and further rotation of the valve shaft holder 42 is restricted.

The valve element 50 is integrally formed at a lower end of the valve shaft 44. The valve element 50 is driven by the driving mechanism 40 to move in the up-and-down direction. The valve element 50 opens and closes the port 16 that is open to the valve chamber 13.

The stator unit 60 includes a fitting hole 60a. The can 30 is fitted into the fitting hole 60a. The stator unit 60 is disposed on an outside of the can 30. The stator unit 60 includes a stator 61 and a mold 62 that is made of synthetic resin.

The stator 61 includes a yoke 61a, a bobbin 61b, and a coil 61c. The coil 61c is wound around the yoke 61a via the bobbin 61b. The stator 61 has a configuration including two coils 61c, which are upper and lower coils. The stator 61 and the rotor 41 constitute a stepping motor.

The mold 62 is disposed to cover the stator 61. The mold 62 includes a tubular portion 63 in a cylindrical shape. The tubular portion 63 protrudes toward the valve body 10. The tubular portion 63 has an inner diameter that is the same as an outer diameter of the main body portion 11 of the valve body 10. The tubular portion 63 is disposed to surround the groove 25. The main body portion 11 of the valve body 10 is fitted inside a lower end of the tubular portion 63.

The sealing member 70 is an O-ring in a circular shape. The sealing member 70 is made of an elastic material such as a rubber material. The sealing member 70 is disposed in the groove 25. The groove 25 is formed in an annular shape by the upper surface 11a of the main body portion 11 of the valve body 10, the outer circumferential surface 12a of the cylindrical portion 12, and the lower surface 20c of the flange member 20. The sealing member 70 is held (disposed in a compressed state) between the outer circumferential surface 12a of the cylindrical portion 12 of the valve body 10 and an inner circumferential surface 63a of the tubular portion 63 of the stator unit 60. The sealing member 70 inhibits water from entering the fitting hole 60a of the stator unit 60. In the present embodiment, the sealing member 70 is in contact with the upper surface 11a of the main body portion 11 of the valve body 10.

In the electric valve 1, the axes of the valve body 10 (the body portion 11 and the cylindrical portion 12), the port 16, the can 30, the rotor 41, the valve shaft holder 42, the guide bush 43, the valve shaft 44, the valve element 50, the stator 61, and the tubular portion 63 are coincident with an axis L. In other words, they are all coaxially disposed.

The operation of the electric valve 1 is described below.

In the electric valve 1, a current is applied to the coil 61c to rotate the rotor 41 in one direction. The valve shaft holder 42 rotates together with the rotor 41. The screw feed action between the internal thread portion 42c of the valve shaft holder 42 and the external thread portion 43c of the guide bush 43 moves the valve shaft holder 42 downward. The valve shaft 44 moves downward together with the valve shaft holder 42, and the valve element 50 closes the port 16.

In the electric valve 1, a current is applied to the coil 61c to rotate the rotor 41 in the other direction. The valve shaft holder 42 rotates together with the rotor 41. The screw feed action between the internal thread portion 42c of the valve shaft holder 42 and the external thread portion 43c of the guide bush 43 moves the valve shaft holder 42 upward. The valve shaft 44 moves upward together with the valve shaft holder 42, and the valve element 50 opens the port 16.

In the manner described above, according to the electric valve 1 in the present embodiment, the upper surface 11a of the valve body 10, the cylindrical portion 12 of the valve body 10, and the flange member 20 form the groove 25 in the annular recess shape. The stator unit 60 includes the tubular portion 63 that surrounds the groove 25. The sealing member 70 is disposed in the groove 25 and held between the cylindrical portion 12 of the valve body 10 and the tubular portion 63 of the stator unit 60. With this configuration, the sealing member 70 can be disposed in the electric valve 1 without an annular recessed groove machined on the outer circumferential surface 12a of the cylindrical portion 12 of the valve body 10, or without a supporting member for the sealing member 70. Thus, manufacturing processes for and members in the electric valve 1 can be reduced. Therefore, it is possible to inhibit, with a small in size and inexpensive configuration, corrosion and rust caused by water entering.

Second Embodiment

Figure 2:
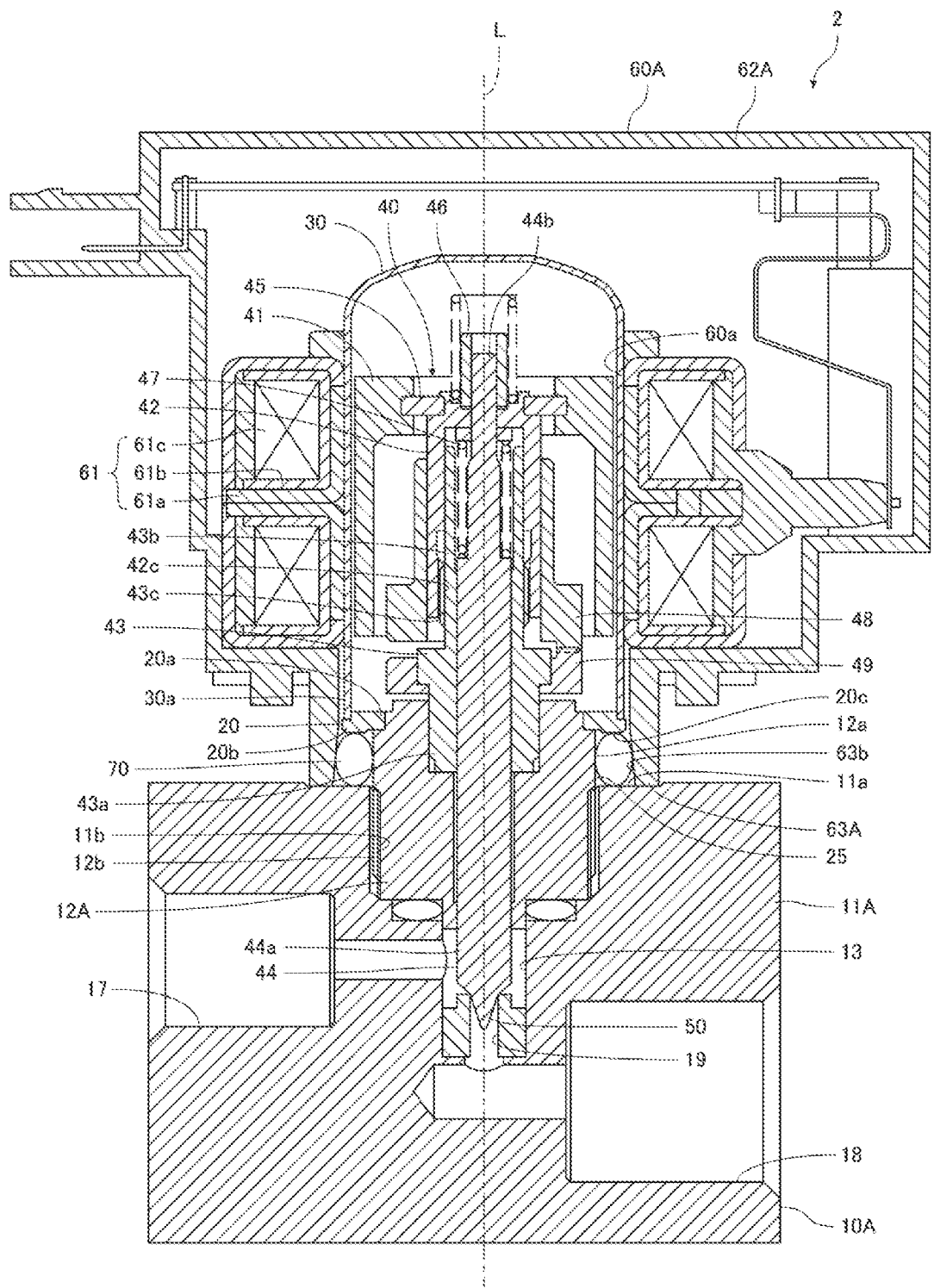
FIG. 2 is a longitudinal sectional view of an electric valve according to a second embodiment of the present invention.

An electric valve according to a second embodiment of the present invention is described below with reference to FIG. 2. FIG. 2 is a sectional view (longitudinal view) along an axis of the electric valve according to the second embodiment of the present invention.

As illustrated in FIG. 2, an electric valve 2 according to the second embodiment includes a valve body 10A, a flange member 20, a can 30, a driving mechanism 40, a valve element 50, a stator unit 60A, and a sealing member 70.

The electric valve 2 has the same (including substantially the same) configuration as the electric valve 1 according to the above first embodiment except for the valve body 10A and the stator unit 60A. The valve body 10A and the stator unit 60A have different configurations from those of the electric valve 1. In the following description, elements that are the same as those of the first embodiment are denoted by corresponding reference signs, and descriptions of these elements are omitted.

The valve body 10A is made of, for example, metal such as aluminum alloy. The valve body 10A includes a main body portion 11A in a rectangular parallelepiped shape and a cylindrical portion 12A. The cylindrical portion 12A protrudes upward from an upper surface 11a of the main body portion 11A (i.e., a surface of the valve body 10A). A valve chamber 13 is provided inside the main body portion 11A. A flow channel 17 is provided in the main body portion 11A and extends to the left in FIG. 2. A flow channel 18 is provided in the main body portion 11A and extends to the right in FIG. 2. The flow channel 17 is connected to the valve chamber 13. The flow channel 18 is connected to the valve chamber 13 via a port 19.

An external thread portion 12b is provided on a part of an outer circumferential surface 12a of the cylindrical portion 12A. An internal thread portion 11b is provided on the main body portion 11A. The internal thread portion 11b is formed so as to open on the upper surface 11a. The external thread portion 12b is screwed into the internal thread portion 11b. Thus, the main body portion 11A and the cylindrical portion 12A are integrally coupled. An inner space of the cylindrical portion 12A is connected to the valve chamber 13.

The stator unit 60A includes a fitting hole 60a. The can 30 is fitted into the fitting hole 60a. The stator unit 60A is disposed on the outside of the can 30. The stator unit 60A includes a stator 61 and a case 62A.

The case 62A is disposed to accommodate the stator 61 in its inner space. The case 62A includes a tubular portion 63A in a cylindrical shape. The tubular portion 63A protrudes toward the valve body 10A. The tubular portion 63A is disposed to surround the groove 25 in the annular shape. A lower end portion of the tubular portion 63A is in contact with the upper surface 11a of the main body portion 11A of the valve body 10A. An inner circumferential surface 63b of the tubular portion 63A is a tapered surface. The inner circumferential surface 63b defines an inner diameter of the tubular portion 63A, the inner diameter increasing in a direction from the flange member 20 toward the upper surface 11a.

The electric valve 2 of the second embodiment also has the functions and effects similar to or the same as those of the electric valve 1 of the first embodiment described above.

The electric valve 2 includes the external thread portion 12b that is provided on the outer circumferential surface 12a of the cylindrical portion 12A of the main valve body 10A. The internal thread portion 11b into which the external thread portion 12b is screwed is formed so as to open on the upper surface 11a of the main body portion 11A of the valve body 10A. The sealing member 70 is in contact with the upper surface 11a of the main body portion 11A of the valve body 10A. With this configuration, the sealing member 70 can inhibit water from entering a point at which the external thread portion 12b is screwed into the internal thread portion 11b.

The tubular portion 63A of the stator unit 60A includes the inner circumferential surface 63b defining the inner diameter of the tubular portion 63A, the inner diameter increasing in a direction from the flange member 20 toward the upper surface 11a of the main body portion 11A of the valve body 10A. With this configuration, when the can 30 is inserted inside the stator unit 60A and the tubular portion 63A of the stator unit 60A is disposed to surround the groove 25 in the annular shape, the inner circumferential surface 63b of the tubular portion 63A can push the sealing member 70 toward the upper surface 11a of the main body portion 11A of the valve body 10A, and the sealing member 70 can be pressed against the upper surface 11a. Therefore, the sealing member 70 can more effectively inhibit water from entering the point at which the external thread portion 12b is screwed into the internal thread portion 11b.

Third Embodiment

Figure 3:
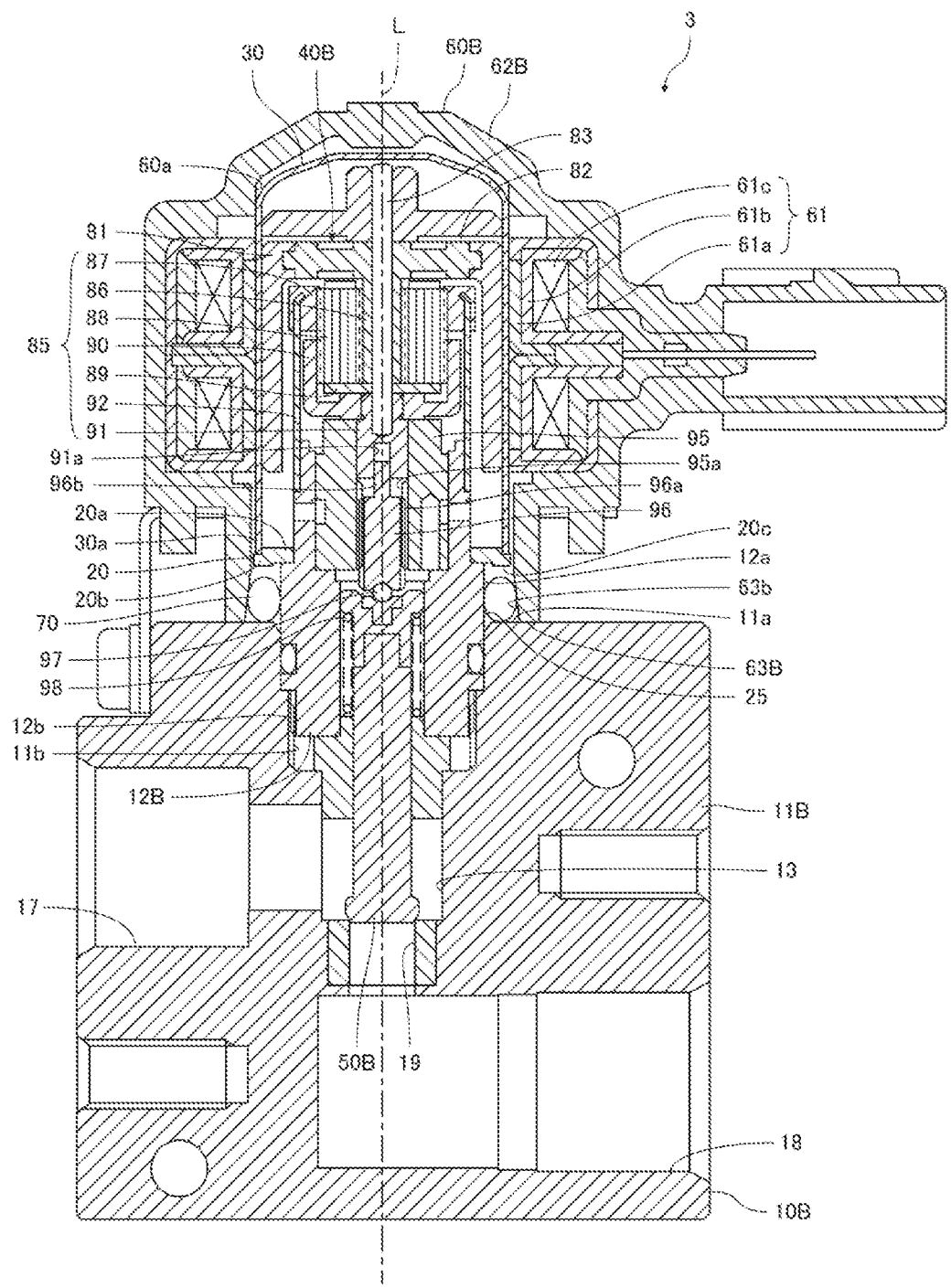
FIG. 3 is a longitudinal sectional view of an electric valve according to a third embodiment of the present invention.

An electric valve according to a third embodiment of the present invention is described below with reference to FIG. 3. FIG. 3 is a sectional view (longitudinal sectional view) along an axis of the electric valve according to the third embodiment of the present invention.

As illustrated in FIG. 3, an electric valve 3 according to the third embodiment includes a valve body 10B, a flange member 20, a can 30, a driving mechanism 40B, a valve element 50B, a stator unit 60B, and a sealing member 70.

The electric valve 3 has the same (including substantially the same) configuration as the electric valve 1 according to the above first embodiment except for the valve body 10B, the driving mechanism 40B, the valve element 50B, and the stator unit 60B. The valve body 10B, the driving mechanism 40B, the valve element 50B, and the stator unit 60B have different configurations from those of the electric valve 1. In the following description, elements that are the same as those of the first embodiment are denoted by corresponding reference signs, and descriptions of these elements are omitted.

The valve body 10B is made of, for example, metal such as aluminum alloy. The valve body 10B includes a main body portion 11B in a rectangular parallelepiped shape and a cylindrical portion 12B. The cylindrical portion 12B protrudes upward from an upper surface 11a of the main body portion 11B (i.e., a surface of the valve body 10B). A valve chamber 13 is provided inside the main body portion 11B. A flow channel 17 is provided in the main body portion 11B and extends to the left in FIG. 3. A flow channel 18 is provided in the main body portion 11B and extends to the right in FIG. 3. The flow channel 17 is connected to the valve chamber 13. The flow channel 18 is connected to the valve chamber 13 via a port 19.

An external thread portion 12b is provided on a part of an outer circumferential surface 12a of the cylindrical portion 12B. An internal thread portion 11b is provided on the main body portion 11B. The internal thread portion 11b is formed so as to open on the upper surface 11a. The external thread portion 12b is screwed into the internal thread portion 11b. Thus, the main body portion 11B and the cylindrical portion 12B are integrally coupled. An inner space of the cylindrical portion 12B is connected to the valve chamber 13.

The driving mechanism 40B drives the valve element 50B in an up-and-down direction (an open-and-close direction). The driving mechanism 40B includes a rotor 81, a planetary gear mechanism 85, a guide member 95, an elevation shaft 96, a ball 97, and valve opening spring 98.

The rotor 81 has a substantially cylindrical shape. An outer diameter of the rotor 81 is slightly smaller than an inner diameter of the can 30. The rotor 81 includes a permanent magnet. The rotor 81 is rotatably disposed in the can 30. An upper end of the rotor 81 and a rotor shaft 83 are integrally coupled via a rotor supporting member 82. The rotor 81 and the stator 61 of the stator unit 60B described later constitute a stepping motor.

The planetary gear mechanism 85 is disposed inside the rotor 81. The planetary gear mechanism 85 includes a sun gear 86, a fixed ring gear 87, a plurality of planetary gears 88, a carrier 89, an output gear 90, an output shaft 91, and a gear case 92. The sun gear 86 is integral with the rotor supporting member 82. The fixed ring gear 87 is an internal gear. The fixed ring gear 87 is fixed to an upper end of the gear case 92 in a cylindrical shape. The planetary gears 88 are disposed between the sun gear 86 and the fixed ring gear 87. The planetary gears 88 mesh with the sun gear 86 and the fixed ring gear 87. The carrier 89 rotatably supports the plurality of the planetary gears 88. The output gear 90 has a bottomed cylindrical shape. The output gear 90 is an internal gear. The output gear 90 surrounds the plurality of the planetary gears 88 and meshes with them. The output shaft 91 has an upper portion that is fixed, by press-fitting or other means, into a hole formed in a bottom portion of the output gear 90. The gear case 92 is attached to an upper end of the cylindrical portion 12B of the valve body 10B.

The guide member 95 has a cylindrical shape and disposed in the upper end of the cylindrical portion 12B of the valve body 10B. An internal thread portion 95a is provided on an inner circumferential surface of the guide member 95.

The elevation shaft 96 has a round columnar shape. An external thread portion 96a is provided on an outer circumferential surface of the elevation shaft 96. The external thread portion 96a is screwed into the internal thread portion 95a of the guide member 95. A flat plate portion 96b protrudes upward from an upper end surface of the elevation shaft 96. The output shaft 91 of the planetary gear mechanism 85 includes a slit 91a. The flat plate portion 96b is inserted into the slit 91a in such a manner as to be movable in the up-and-down direction. The elevation shaft 96 is rotated together with rotation of the output shaft 91. The screw feed action between the external thread portion 96a and the internal thread portion 95a moves the elevation shaft 96 in the up-and-down direction.

The ball 97 is disposed between the elevation shaft 96 and the valve element 50B. The valve opening spring 98 is a compression coil spring. The valve opening spring 98 is disposed between the valve element 50B and the valve body 10B.

The valve element 50B has a substantially round columnar shape. A lower end of the valve element 50B faces the port 19 in the up-and-down direction. An upper end of the valve element 50B is connected to the elevation shaft 96 via the ball 97. The valve element 50B is pushed upward by the valve opening spring 98.

The stator unit 60B includes a fitting hole 60a. The can 30 is fitted into the fitting hole 60a. The stator unit 60B is disposed on the outside of the can 30. The stator unit 60B includes the stator 61 and a mold 62B that is made of synthetic resin.

The mold 62B is disposed to cover the stator 61. The mold 62B includes a tubular portion 63B in a cylindrical shape. The tubular portion 63B protrudes toward the valve body 10B. The tubular portion 63B is disposed to surround the groove 25 in the annular shape. A lower end portion of the tubular portion 63B is in contact with the upper surface 11a of the main body portion 11B of the valve body 10B. An inner circumferential surface 63b of the tubular portion 63B is a tapered surface. The inner circumferential surface 63b defines an inner diameter of the tubular portion 63B, the inner diameter increasing in a direction from the flange member 20 toward the upper surface 11a.

The operation of the electric valve 3 is described below.

In the electric valve 3, a current is applied to the coil 61c to rotate the rotor 81 in one direction. When the rotor 81 rotates, the elevation shaft 96 rotates together with the output shaft 91 of the planetary gear mechanism 85. The screw feed action between the external thread portion 96a of the elevation shaft 96 and the internal thread portion 95a of the guide member 95 moves the elevation shaft 96 downward. The valve element 50B is pushed downward by the elevation shaft 96, and the valve element 50B closes the port 19.

In the electric valve 3, a current is applied to the coil 61c to rotate the rotor 81 in the other direction. When the rotor 81 rotates, the elevation shaft 96 rotates together with the output shaft 91 of the planetary gear mechanism 85. The screw feed action between the external thread portion 96a of the elevation shaft 96 and the internal thread portion 95a of the guide member 95 moves the elevation shaft 96 upward. When the elevation shaft 96 moves upward, the valve element 50B is pushed upward by the valve opening spring 98, and the valve element 50B opens the port 19.

The electric valve 3 of the third embodiment also has the functions and effects similar to or the same as those of the electric valve 2 of the second embodiment described above.

Although the embodiments of the present invention have been described above, the present invention is not limited to these embodiments. Addition and removal of components and design changes may be suitably made to the above-described embodiments by those skilled in the art, and other embodiments obtained by suitably combining features of the above-described embodiments are also within the scope of the present invention as long as they not contrary to the gist of the present invention.

REFERENCE SIGNS LIST

First Embodiment

1 . . . electric valve, 10 . . . valve body, 11 . . . main body portion, 11a . . . upper surface, 12 . . . cylindrical portion, 12a . . . outer circumferential surface, 13 . . . valve chamber, 14, 15 . . . conduit, 16 . . . port, 20 . . . flange member, 20a . . . inner peripheral edge, 20b . . . outer peripheral edge, 20c . . . lower surface, 25 . . . groove, 30 . . . can, 30a . . . lower end, 40 . . . driving mechanism, 41 . . . rotor, 42 . . . valve shaft holder, 42c . . . internal thread portion, 43 . . . guide bush, 43a . . . large-diameter cylindrical portion, 43b . . . small-diameter cylindrical portion, 43c . . . external thread portion, 44 . . . valve shaft, 44a . . . stem body, 44b . . . upper small-diameter portion, 45 . . . supporting ring, 46 . . . push nut, 47 . . . compression coil spring, 48 . . . upper stopper member, 49 . . . lower stopper member, 50 . . . valve element, 60 . . . stator unit, 60a . . . fitting hole, 61 . . . stator, 61a . . . yoke, 61b . . . bobbin, 61c . . . coil, 62 . . . mold, 63 . . . tubular portion, 63a . . . inner circumferential surface, 70 . . . sealing member, L . . . axis, Second Embodiment 2 . . . electric valve, 10A . . . valve body, 11A . . . main body portion, 11b . . . internal thread portion, 12A . . . cylindrical portion, 12b . . . external thread portion, 17, 18 . . . flow channel, 19 . . . port, 60A . . . stator unit, 62A . . . case, 63A . . . tubular portion, 63b . . . inner circumferential surface, Third Embodiment 3 . . . electric valve, 10B . . . valve body, 11B . . . main body portion, 11b . . . internal thread portion, 12B . . . cylindrical portion, 12b . . . external thread portion, 17, 18 . . . flow channel, 19 . . . port, 40B . . . driving mechanism, 50B . . . valve element, 60B . . . stator unit, 62B . . . mold, 63B . . . tubular portion, 63b . . . inner circumferential surface, 81 . . . rotor, 82 . . . rotor supporting member, 83 . . . rotor shaft, 85 . . . planetary gear mechanism, 86 . . . sun gear, 87 . . . fixed ring gear, 88 . . . planetary gear, 89 . . . carrier, 90 . . . output gear, 91 . . . output shaft, 91a . . . slit, 92 . . . gear case, 95 . . . guide member, 95a . . . internal thread portion, 96 . . . elevation shaft, 96a . . . external thread portion, 96b . . . flat plate portion, 97 . . . ball, 98 . . . valve opening spring

The invention claimed is:

1. An electric valve comprising:
a valve body including a valve chamber;
a flange member in a circular shape whose inner peripheral edge is attached to a cylindrical portion protruding from a surface of the valve body;
a can in a cylindrical shape attached to an outer peripheral edge of the flange member;
a rotor disposed in the can;
a valve element driven by rotation of the rotor to open and close a port in the valve chamber; and
a stator unit attached on an outside of the can,
wherein the surface of the valve body, the cylindrical portion of the valve body, and the flange member form a groove in an annular recess shape,
wherein the stator unit includes a tubular portion that surrounds the groove, and
wherein a sealing member in an annular shape is disposed in the groove and held between the cylindrical portion of the valve body and the tubular portion of the stator unit.

2. The electric valve according to claim 1,
wherein an external thread portion is formed on an outer circumferential surface of the cylindrical portion of the valve body,
wherein an internal thread portion into which the external thread portion is screwed is formed so as to open on the surface of the valve body, and
wherein the sealing member is disposed in contact with the surface of the valve body.

3. The electric valve according to claim 2, wherein the tubular portion of the stator unit includes an inner circumferential surface defining an inner diameter of the tubular portion, the inner diameter increasing in a direction from the flange member toward the surface of the valve body.

* * * * *